United States Patent Office 2,894,958
Patented July 14, 1959

2,894,958

2-ACETYL-7-OXO - 1,2,3,4,4A,4B,5,6,7,9,10,10A - DO-DECAHYDROPHENANTHRENE AND PROCESS

Moses Wolf Goldberg, Upper Montclair, and William Edwin Scott, North Caldwell, N.J., assignors to Hoffmann-La Roche Inc., Nutley, N.J., a corporation of New Jersey No Drawing. Application February 21, 1957
Serial No. 641,480

13 Claims. (Cl. 260—340.9)

This invention relates to the production of 2-acetyl-7-oxo - 1,2,3,4,4a,4b,5,6,7,9,10,10a - dodecahydrophenanthrene and to a method for synthesizing that compound. Also within the scope of the invention are the novel intermediates utilized in the production of 2-acetyl-7-oxo-1,2,3,4,4a,4b,5,6,7,9,10,10a-dodecahydrophenanthrene.

2 - acetyl - 7 - oxo - 1,2,3,4,4a,4b,5,6,7,9,10,10a - dodecahydrophenanthrene is synthesized by the following series of reactions. 1-vinyl-6-methoxy-3,4-dihydronaphthalene is reacted with methyl vinyl ketone, preferably in a solvent such as a lower aliphatic alcohol, e.g. isopropanol, ethanol, a fatty acid, e.g. acetic acid, or an inert hydrocarbon solvent, e.g. heptane, to obtain 2-acetyl-7-methoxy-1,2,3,9,10,10a-hexahydrophenanthrene. The last named compound is isomerized in acid solution to 2-acetyl - 7 - methoxy - 1,2,3,4,9,10 - hexahydrophenanthrene, which in turn is converted to an acetal derivative, for example its cyclic ethylene acetal. The latter can be obtained, for example, by refluxing 2-acetyl-7-methoxy-1,2,3,4,9,10-hexahydrophenanthrene with ethylene glycol and p-toluene sulfonic acid in an inert solvent, such as an aromatic hydrocarbon, e.g. benzene, toluene, etc., and removing the water formed in the reaction by azeotropic distillation. The cyclic ethylene acetal is then reduced in liquid ammonia at a low temperature with lithium and an alcohol, such as methanol, ethanol, etc., to obtain the cyclic ethylene acetal of 2-acetyl-7-methoxy-1,2,3,4,4a,5,8,9,10,10a-decahydrophenanthrene. The last named compound can be hydrolyzed with an acid, such as hydrochloric acid, oxalic acid, etc., to obtain the product 2-acetyl - 7 - oxo-1,2,3,4,4a,4b,5,6,7,9,10,10a-dodecahydrophenanthrene.

Alternatively, the cyclic ethylene acetal of 2-acetyl-7-methoxy-1,2,3,4,9,10-hexahydrophenanthrene may be reduced stepwise. The first reduction step is carried out in liquid ammonia at a low temperature with potassium and ammonium chloride, and the product is then hydrolyzed with acid to obtain 2-acetyl-7-methoxy-1,2,3,4,4a,9,10,10a-octahydrophenanthrene. The latter is in turn converted to its cyclic ethylene acetal by treatment with ethylene glycol and p-toluene sulfonic acid in a solvent. The cyclic ethylene acetal is then further reduced in liquid ammonia at a low temperature with lithium and an alcohol, and the reduction product then hydrolyzed to produce 2-acetyl - 7 - oxo - 1,2,3,4,4a,4b,5,6,7,9,10,10a - dodecahydrophenanthrene, identical with the product obtained above.

2 - acetyl - 7 - oxo - 1,2,3,4,4a,4b,5,6,7,9,10,10a - dodecahydrophenanthrene is useful as an anti-androgen, e.g. it inhibits the hypertrophic effect of testosterone propionate and dehydroisoandrosterone on the seminal vesicles and prostate without the undesirable side effects produced by estrogens. The product of this invention may be administered orally or parenterally by combining therapeutic doses with conventional carriers and/or excipients to form tablets, syrups, elixirs, or injectables, according to accepted pharmaceutical practice.

The compounds of this invention have asymmetric carbon atoms and the various stereoisomers are included within the scope of this invention.

The following examples are illustrative of the invention. All temperatures are in degrees centigrade and all melting points are corrected.

Example 1

A mixture of 65 g. of 1-vinyl-6-methoxy-3,4-dihydronaphthalene and 68 ml. of methyl vinyl ketone in 300 ml. of heptane was refluxed for 4 hours and then let stand overnight at room temperature. The solvent and excess methyl vinyl ketone were removed by distillation at 10 mm. pressure in a water bath at 70° and the residue was distilled at 0.1 mm. The fraction boiling between 155 and 168° was collected, dissolved in methanol and cooled to 8°, at which temperature crystallization took place. The 2-acetyl-7-methoxy-1,2,3,9,10,10a-hexahydrophenanthrene thus obtained was recrystallized from petroleum ether, M.P. 87–88°.

Example 2

0.10 g. of 2-acetyl-7-methoxy-1,2,3,9,10,10a-hexahydrophenanthrene in 5 ml. of methylene chloride was treated with dry hydrogen chloride. After standing 10 minutes at room temperature, the solution was evaporated to dryness and the residue was crystallized from petroleum ether. The 2-acetyl-7-methoxy-1,2,3,4,9,10-hexahydrophenanthrene thus obtained melted at 86–87°. The mixed melting point with 2-acetyl-7-methoxy-1,2,3,9,10,10a-hexahydrophenanthrene, described in Example 1, was depressed.

Example 3

A mixture of 35.74 g. of 2-acetyl-7-methoxy-1,2,3,4,9,10-hexahydrophenanthrene, 17 ml. of ethylene glycol, and 0.25 g. of p-toluenesulfonic acid monohydrate in 240 ml. of benzene was refluxed for 5 hours with a water separator. The solution was washed twice with 50 ml. sodium carbonate and twice with 50 ml. of water. After being dried with sodium sulfate, the organic layer was stripped of solvent in vacuo; the residual viscous oil, the cyclic ethylene acetal of 2-acetyl-7-methoxy-1,2,3,4,9,10-hexahydrophenanthrene, could not be crystallized.

Example 4

A solution of 40 g. of the cyclic ethylene acetal of 2 - acetyl - 7 - methoxy - 1,2,3,4,9,10 - hexahydrophenanthrene in 1.25 liters of ether was added, with stirring, to 2.5 liters of liquid ammonia at −40° C. 35 g. of lithium metal were then added to the stirred solution at −40° within ½ hour. When all the lithium was dissolved, methanol was added to the vigorously stirred solution at such a rate that the dark blue color was discharged in 30 minutes. About 225 ml. of methanol were required. The ammonia was permitted to boil off, the residue was diluted with about 500 ml. of ether and treated with ice and water (about 2 liters). The ether was separated and washed twice with 1 liter of water. The water layers were washed with 1 liter of ether. The combined ether extracts were dried with sodium sulfate and the solvent was removed in vacuo. The residue, the cyclic ethylene acetal of 2-acetyl-7-methoxy-1,2,3,4,4a,5,8,9,10,10a-decahydrophenanthrene, was twice crystallized from methanol. The product melted at 77–78°.

Example 5

A solution of 18.8 g. of the cyclic ethylene acetal of 2-acetyl-7-methoxy - 1,2,3,4,4a,5,8,9,10,10a-decahydrophenanthrene in 375 ml. ethanol and 94 ml. of 3 N HCl was refluxed for one hour. The solution was then concentrated in vacuo and diluted with 400 ml. of water, at which point a solid material crystallized out. The solid material was filtered off and recrystallized from methylene chloride-petroleum ether. The 2-acetyl-7-oxo-1,2,3,4,4a,4b,5,6,7,9,10,10a - dodecahydrophenanthrene thus obtained melted at 101–103°. Recrystallization from petroleum ether raised the M.P. to 103–104°.

*Example 6*

A solution of 30.1 g. of the cyclic ethylene acetal of 2-acetyl-7 - methoxy - 1,2,3,4,9,10 - hexahydrophenanthrene in 300 ml. of anhydrous ether was added, with stirring, to a solution of 13.8 g. of potassium in 900 ml. of liquid ammonia at −40°. After the solution was stirred for 45 minutes, 23 g. of ammonium chloride were added, and the ammonia was permitted to boil off while stirring was continued.

The residue was treated with ice, water and an additional 200 ml. of ether. The ether layer was separated and washed with water. The water layers were washed with 100 ml. of ether. The ether layers were combined, dried with sodium sulfate, and the solvent was removed in vacuo.

To the residue, dissolved in 300 ml. of methanol, were added 7.5 g. of oxalic acid and 75 ml. of water, and the mixture was refluxed for one hour. The methanol was removed in vacuo, the residue was diluted with 100 ml. of water and extracted with 300 ml. of ether. The organic layer was separated and washed with water. The water layers were washed with 100 ml. of ether. The combined organic layers were dried with sodium sulfate, and the solvent was removed in vacuo. The residue, 2-acetyl-7-methoxy - 1,2,3,4,4a,9,10,10a - octahydrophenanthrene, was crystallized from a small volume of ethanol, and then recrystallized from petroleum ether, M.P. 83–85°.

*Example 7*

A mixture of 3.3 g. of 2-acetyl-7-methoxy-1,2,3,4,4a,9,10,10a-octahydrophenanthrene, 28 ml. of benzene, 1.8 ml. of ethylene glycol and 0.10 g. of p-toluene sulfonic acid monohydrate was refluxed for 4 hours with a water separator. The solution was then washed successively with 10 ml. of water and 10 ml. of a 10% sodium carbonate solution. After being dried with sodium sulfate, the solvent was removed in vacuo and the solid residue, the cyclic ethylene acetal of 2-acetyl-7-methoxy-1,2,3,4,4a,9,10,10a-octahydrophenanthrene was recrystallized from methanol. The product melted at 72–73°.

*Example 8*

3.0 g. of the cyclic ethylene acetal of 2-acetyl-7-methoxy-1,2,3,4,4a,9,10,10a-octahydrophenanthrene were reduced and hydrolyzed according to the procedure described in Examples 4 and 5. 2.05 g. of the hydrolysis product were dissolved in methylene chloride-petroleum ether, 5:95, and chromatographed on a column of 20 grams of aluminum oxide (chromatographic grade). Eluates were collected as follows: (1) 100 ml. methylene chloride-petroleum ether solvent, (2) 50 ml. methylene chloride-petroleum ether solvent, (3) 100 ml. methylene chloride solvent.

Fractions 1 and 2 were combined and crystallized from petroleum ether. The product, 2-acetyl-7-methoxy-1,2,3,-4,4a,9,10,10a-octahydrophenanthrene, melted at 83° and gave no mixed melting point depression with the product of Example 6.

Fraction 3 crystallized from petroleum ether in long needles melting at 103 to 104°. The 2-acetyl-7-oxo-1,2,-3,4,4a,4b,5,6,7,9,10,10a - dodecahydrophenanthrene thus obtained gave no mixed melting point depression with the product of Example 5.

We claim:

1. 2-acetyl-7-methoxy - 1,2,3,9,10,10a - hexahydrophenanthrene.

2. 2-acetyl-7-methoxy-1,2,3,4,9,10 - hexahydrophenanthrene.

3. Cyclic ethylene acetal of 2-acetyl-7-methoxy-1,2,3,-4,9,10-hexahydrophenanthrene.

4. Cyclic ethylene acetal of 2-acetyl-7-methoxy-1,2,3,-4,4a,5,8,9,10,10a-decahydrophenanthrene.

5. 2-acetyl-7-methoxy - 1,2,3,4,4a,9,10,10a - octahydrophenanthrene.

6. Cyclic ethylene acetal of 2-acetyl-7-methoxy-1,2,3,-4,4a,9,10,10a-octahydrophenanthrene.

7. 2-acetyl-7-oxo-1,2,3,4,4a,4b,5,6,7,9,10,10a - dodecahydrophenanthrene.

8. A process which comprises heating 1-vinyl-6-methoxy-3,4-dihydronaphthalene with methyl vinyl ketone in an inert solvent, isomerizing the 2-acetyl-7-methoxy-1,2,3,9,10,10a-hexahydrophenanthrene thus obtained in acid solution to produce 2-acetyl-7-methoxy-1,2,3,4,9,10-hexahydrophenanthrene, refluxing the last named compound with ethylene glycol and p-toluene sulfonic acid to produce the cyclic ethylene acetal of said compound, reducing said cyclic ethylene acetal with lithium and lower alkanol in liquid ammonia at a low temperature to obtain the cyclic ethylene acetal of 2-acetyl-7-methoxy-1,2,3,4,4a,5,8,9,10,10a-decahydrophenanthrene, and hydrolyzing the last named compound in acid solution to obtain 2-acetyl-7-oxo-1,2,3,4,4a,4b,5,6,7,9,10,10a-dodecahydrophenanthrene.

9. A process which comprises heating 1-vinyl-6-methoxy-3,4-dihydronaphthalene with methyl vinyl ketone in an inert solvent, isomerizing the 2-acetyl-7-methoxy-1,2,3,9,10,10a-hexahydrophenanthrene thus obtained in acid solution to produce 2-acetyl-7-methoxy-1,2,3,4,9,10-hexahydrophenanthrene, refluxing the last named compound with ethylene glycol and p-toluene sulfonic acid to produce the cyclic ethylene acetal of said compound, reducing said cyclic ethylene acetal with potassium and ammonium chloride, in liquid ammonia at a low temperature, and hydrolyzing the product of said reduction with acid to obtain 2-acetyl-7-methoxy-1,2,3,4,4a,9,10,10a-octahydrophenanthrene, converting the last named compound to its cyclic ethylene acetal by treatment with ethylene glycol and p-toluene sulfonic acid, reducing the last named cyclic ethylene acetal with lithium and lower alkanol in liquid ammonia at a low temperature, and hydrolyzing the product in acid solution to obtain 2-acetyl-7-oxo-1,2,3,4,4a,4b,5,6,7,9,10,10a-dodecahydrophenanthrene.

10. A process which comprises reducing the cyclic ethylene acetal of 2-acetyl-7-methoxy-1,2,3,4,9,10-hexahydrophenanthrene with lithium and lower alkanol in liquid ammonia, to produce the cyclic ethylene acetal of 2-acetyl - 7 - methoxy-1,2,3,4,4a,5,8,9,10,10a-decahydrophenanthrene, and hydrolyzing the last named compound in acid solution to obtain 2-acetyl-7-oxo-1,2,3,4,4a,4b,5,6,7,9,10,10a-dodecahydrophenanthrene.

11. A process which comprises hydrolyzing the cyclic ethylene acetal of 2-acetyl-7-methoxy-1,2,3,4,4a,5,8,9,10,10a-decahydrophenanthrene in acid solution to obtain 2-acetyl-7-oxo-1,2,3,4,4a,4b,5,6,7,9,10,10a-dodecahydrophenanthrene.

12. A process which comprises reducing the cyclic ethylene acetal of 2-acetyl-7-methoxy-1,2,3,4,9,10-hexahydrophenanthrene with potassium and ammonium chloride in liquid ammonia at a low temperature, hydrolyzing the product thus obtained with acid to obtain 2-acetyl-7-methoxy-1,2,3,4,4a,9,10,10a-octahydrophenanthrene, converting said last named compound to its cyclic ethylene acetal by treatment with ethylene glycol and p-toluene sulfonic acid, reducing the last named cyclic ethylene acetal with lithium and lower alkanol in liquid ammonia at a low temperature, and hydrolyzing in acid solution the product thus obtained to produce 2-acetyl-7-oxo-1,2,3,4,4a,4b,5,6,7,9,10,10a-dodecahydrophenanthrene.

13. A process which comprises reducing the cyclic ethylene acetal of 2-acetyl-7-methoxy-1,2,3,4,4a,9,10,10a-octahydrophenanthrene with lithium and lower alkanol in liquid ammonia at a low temperature, and hydrolyzing the product in acid solution to obtain 2-acetyl-7-oxo-1,2,3,4,4a,4b,5,6,7,9,10,10a-dodecahydrophenanthrene.

References Cited in the file of this patent

UNITED STATES PATENTS

| | | |
|---|---|---|
| 2,660,586 | Murray et al. | Nov. 24, 1953 |
| 2,722,532 | Arth et al. | Nov. 1, 1955 |
| 2,739,974 | Colton | Mar. 21, 1956 |
| 2,830,074 | Farinacci | Apr. 8, 1958 |

FOREIGN PATENTS

| | | |
|---|---|---|
| 861,274 | France | Oct. 22, 1940 |
| 1,078,523 | France | May 12, 1954 |
| 751,723 | Great Britain | July 4, 1956 |

OTHER REFERENCES

Julian et al.: Journal Am. Chem. Soc., vol. 71, p. 756, February 1949.

Benkeser et al.: Jour. Am. Chem. Soc., vol. 76, pp. 631–632, January 1954.